United States Patent [19]

Boudakian et al.

[11] Patent Number: 4,774,266
[45] Date of Patent: Sep. 27, 1988

[54] N-SUBSTITUTED 5-PHENYLTETRAZOLES AS HIGH TEMPERATURE BLOWING AGENTS

[75] Inventors: Max M. Boudakian, Pittsford, N.Y.; Kiran B. Chandalia, Cheshire; Eugene F. Rothgery, North Branford; Mary G. Harscher, Hamden, all of Conn.

[73] Assignee: Olin Corporation, Cheshire, Conn.

[21] Appl. No.: 125,855

[22] Filed: Nov. 27, 1987

[51] Int. Cl.$^4$ .............................................. C08J 9/10
[52] U.S. Cl. ...................................... 521/90; 521/95; 521/145; 521/180; 521/182; 521/184; 521/189
[58] Field of Search ...................................... 521/90, 95

[56] References Cited

U.S. PATENT DOCUMENTS

| | | | |
|---|---|---|---|
| 3,528,897 | 9/1970 | Scheiner | 204/158 |
| 3,873,477 | 3/1975 | Beck | 521/95 |
| 4,142,029 | 2/1979 | Illy | 521/95 |
| 4,158,724 | 6/1979 | Illy et al. | 521/90 |
| 4,258,138 | 3/1981 | Britton | 521/90 |
| 4,616,042 | 10/1986 | Avakian | 521/90 |

OTHER PUBLICATIONS

Braun, J. V., et al, Ber. 74B, pp. 264-272, (1941), "Synthesis in the Tetrazole Series, II, Julius v. Braun and Walter Rudolph.
Busilova, S. R., et al, Khim. Geterotsikl. Soedin, 1983 (1), pp. 119-121, "Reaction of 5-Phenyltetrazole and Alpha-Epoxides", (English Translation).
Casey, M., et al, J. Chem. Soc., Chem. Commun. No. 13, pp. 714-715, Jul. 1, 1982, "A New Synthesis of Imidazoles".
Henry, R. A., J. Heterocyclic Chem., No. 13, pp. 391-392, (1976), "t-Butylation of 5-Substituted Tetrazoles".
Mihina, J., et al, J. Org. Chem., No. 15, pp. 1082-1092, (1950), "The Reaction of Nitriles with Hydrazoic Acid: Synthesis of Monosubstituted Tetrazoles".
Pawda, A., et al, J. Org. Chem., 43(9), pp. 1664-1671, (1978), "Intramolecular 1,3-Dipolar Cycloaddition Reactions of Alkenyl-Substituted Nitrile Imines".
Spear, R. J., Aust. J. Chem., 37 (12), pp. 2453-2468, (1984); Chem. Absts. 102, 185012w (1985), "Positional Selectivity of the Methylation of 5-Substituted Tetrazole Anions".

Primary Examiner—Morton Foelak
Attorney, Agent, or Firm—James B. Haglind

[57] ABSTRACT

A process for the production of cellular products which comprises incorporating a blowing agent into rubber or a thermoplastic material uses as the blowing agent a tetrazole compound represented by the formula:

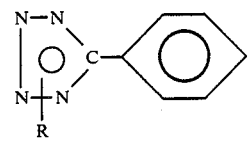

in which R represents an alkyl, cycloalkyl, hydroxyalkyl, polyhydroxyalkyl, aryl, alkylaryl, aralkylene, alkenyl, alkenylaryl or alkenylaralkylene group.

The novel blowing agents of the present invention include compounds which are liquids which may be directly incorporated into the molten rubber or thermoplastic material. The blowing agents of this invention are especially useful, as indicated, with polymers and copolymers that have high processing temperatures as they minimize polymer degradation and provide products with increased impact strengths.

20 Claims, No Drawings

N-SUBSTITUTED 5-PHENYLTETRAZOLES AS HIGH TEMPERATURE BLOWING AGENTS

This invention is related to blowing agents for cellular or plastic foams. More particularly, the invention is related to selected tetrazole compounds used as blowing agents in the production of foamed plastics.

The use of blowing agents in the manufacture of cellular or foamed synthetic plastic products is well established. A blowing agent is a chemical compound which decomposes on heating to a specific temperature to yield a vapor or gas or mixture of vapors and gases. In use, the blowing agent is incorporated in the thermoplastic material at a temperature below the decomposition temperature of the blowing agent and the mixture subsequently heated to a temperature above the decomposition temperature of the blowing agent whereupon the blowing agent decomposes to liberate a gas or vapor which forms small voids within the thermoplastic material. It is, of course, of importance that the blowing agent be homogeneously dispersed within the thermoplastic material to obtain a product having a uniform cellular structure.

An important characteristic of a blowing agent is the temperature at which it decomposes to liberate gas or vapor. This decomposition temperature limits the temperature at which other operations may be performed on the thermoplastic material after incorporation of the blowing agent but before actual formation of the cellular product. It is, therefore, often of convenience to employ a blowing agent having a relatively high temperature of decomposition, this being especially the case when forming cellular products of thermoplastic material having relatively high fusion temperatures.

Commercially, 5-phenyltetrazole has been widely used as a blowing agent for foaming high temperature-processing polymers such as polycarbonates, polyesters, polyphenylene oxides, and nylons.

While 5-phenyltetrazole is an effective high temperature blowing agent, it has been found to have deficiencies in certain applications. For example, when 5-phenyltetrazole is used with polycarbonate resins, some polymer degradation takes place during the foaming process as evidenced, for example, by a reduction in foam impact strength.

U.S. Pat. No. 3,873,477, issued Mar. 25, 1975 to W. Beck et al describes tetrazole salts of polyvalent metals such as zinc, barium, calcium, lead temperature polymers. In addition to the complex salts, Beck et al suggests intra-ring compounds which could be linked through the carbon atom on the tetrazole ring.

Bis-tetrazoles bridged at the carbon atoms (5,5' positions) or by a phenyl group at the 1,1' position of the tetrazole ring have been described by H. Illy, in U.S. Pat. No. 4,142,029, issued Feb. 27, 1979, as blowing agents for thermoplastic resins.

There is a need, however, for improved high temperature blowing agents which are less complex structures and which minimize polymer degradation and provide increased impact strength to the foamed articles.

In addition, there is a need for a process for producing cellular products from rubber or thermoplastic materials which incorporates high temperature blowing agents which minimize polymer degradation and provide increased impact strengths.

Further, there is a need for high temperature blowing agents which are liquid at ambient conditions to remove the need to handle powders and also to eliminate the dry blending and drying steps in a structural foam molding process.

These and other objects of the present invention are accomplished in an improved process for the production of cellular products which comprises incorporating a blowing agent into a rubber or a thermoplastic material. The improvement comprises using as the blowing agent a tetrazole compound represented by the formula:

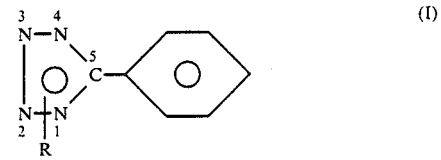

in which R represents an alkyl, cycloalkyl, hydroxyalkyl, polyhydroxyalkyl, aryl, alkylaryl, aralkylene, alkenyl, alkenylaryl, or alkenylaralkylene group.

In more detail, the novel blowing agents of the present invention are N-substituted 5-phenyl-tetrazole compounds as represented by Formula I above in which R is bonded to the tetrazole ring at the 1- or 2-position as shown in the following formulas:

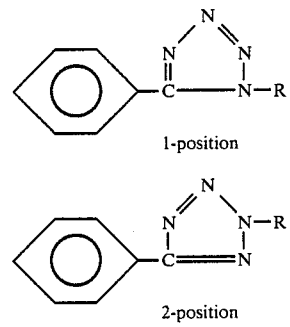

or as isomeric mixtures of the 1- and 2-substituted 5-phenyltetrazoles.

Suitable alkyl groups as represented by R in the above formula include, for example, methyl, ethyl, propyl, isopropyl, butyl, isobutyl, tert-butyl, pentyl, neopentyl, isopentyl, hexyl, isohexyl, methylhexyl, heptyl, octyl, tetramethylbutyl, nonyl and decyl.

N-alkyl 5-phenyltetrazoles which are preferred as blowing agents in the present invention are those in which the alkyl group contains from about 4 to 8 carbon atoms and are exemplified by butyl, isobutyl, tert-butyl, pentyl, neopentyl, isopentyl, hexyl, isohexyl, methylhexyl, heptyl, octyl, and tetramethylbutyl.

More preferred of these higher alkyl compounds are those having straight chain alkyl groups such as n-butyl, n-pentyl, n-hexyl and n-octyl.

N-Substituted 5-phenyltetrazole blowing agents in which R represents a cycloalkyl group include those in which the cycloalkyl group contains from about 3 to about 6 carbon atoms, i.e., N-cyclopropyl 5-phenyltetrazole, N-cyclobutyl 5-phenyltetrazole, N-cyclopentyl 5-phenyltetrazole, and N-cyclohexyl 5-phenyltetrazole.

N-Substituted 5-phenyltetrazole compounds in which R represents a mono- or polyhydroxyalkyl derivative include those in which the alkyl moiety has from 1 to about 6 carbon atoms. N-hydroxymethyl 5-phenyltetrazole, N-hydroxyethyl 5-phenyltetrazole, N-(2,3-dihydroxypropyl) 5-phenyltetrazole, N-hydroxybutyl 5-phenyltetrazole, N-2,4-dihydroxybutyl) 5-phenyltetrazole, N-hydroxypentyl 5-phenyltetrazole, and N-hydroxyhexyl 5-phenyltetrazole serve as examples.

Turning now to the compounds of Formula I in which R represents an aryl group, illustrative as blowing agents are N-phenyl 5-phenyltetrazole and N-naphthyl 5-phenyltetrazole.

N-Alkylaryl 5-phenyltetrazole compounds which may be employed as novel blowing agents represented by Formula I are those in which the aryl moiety is, for example, phenyl or naphthyl and the alkyl moiety contains from 1 to about 6 carbon atoms. N-Tolyl 5-phenyltetrazole, N-methylnaphthyl 5-phenyltetrazole, N-xylyl 5-phenyltetrazole, N-ethylphenyl 5-phenyltetrazole, N-ethylnaphthyl 5-phenyltetrazole, N-propylphenyl 5-phenyltetrazole, N-isopropylnaphthyl 5-phenyltetrazole, N-butylphenyl 5-phenyltetrazole, N-tert-butylphenyl 5-phenyltetazole, N-butylnaphthyl 5-phenyltetrazole, N-pentylnaphthyl 5-phenyltetrazole, and N-hexylphenyl 5-phenyltetrazole are representative of the N-alkylaryl 5-phenyltetrazoles.

N-aralkylene 5-phenyltetrazole blowing agents of the present invention include those in which the aryl moiety is phenyl or naphthyl and includes substituted aryl moieties in which the substituent is, for example, a lower alkyl group. The alkylene moiety of the aralkylene group is, for example, methylene, ethylene, propylene, and the like.

Where R in Formula I above represents an alkenyl, alkenylaryl, or alkenylaralkylene groups, blowing agents which may be employed include those in which the alkenyl moiety contains from 2 to about 6 carbon atoms and at least one double bond. The aryl moiety is phenyl or naphthyl and the aralkylene moiety includes those described above. For example, N-vinyl 5-phenyltetrazole, N-vinylphenyl 5-phenyltetrazole, N-vinylbenzyl 5-phenyltetrazole, N-vinylphenylpropylene 5-phenyltetrazole, N-vinylnaphthyl 5-phenyltetrazole, N-propenyl 5-phenyltetrazole, N-allyl 5-phenyltetrazole, N-allylnaphthyl 5-phenyltetrazole, N-propenylphenylethylene 5-phenyltetrazole, N-isopropenylnaphthylethylene 5-phenyltetrazole, N-butenyl 5-phenyltetrazole, N-isobutenylbenzyl 5-phenyltetrazole, N-butadienyl 5-phenyltetrazole, N-pentenylbenzyl 5-phenyltetrazole, and N-hexenyl 5-phenyltetrazole are representative compounds.

Surprisingly the novel N-alkenylbenzyl 5-phenyltetrazole compounds may be polymerized as homopolymers or co-polymers to produce novel polymeric compositions suitable as blowing agents which are represented by the following formula:

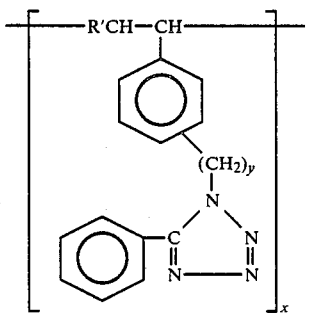

wherein R' represents H or an alkyl group having from 1 to about 3 carbon atoms; and y represents 1 to about 3.

Examples of these novel compositions include, for example, homopolymers of N-vinylbenzyl 5-phenyltetrazole, N-vinylphenylethylene 5-phenyltetrazole, N-vinylphenylpropylene 5-phenyltetrazole, N-propenylbenzyl 5-phenyltetrazole, N-allylbenzyl 5-phenyltetrazole, N-butenylbenzyl 5-phenyltetrazole, N-pentenylbenzyl 5-phenyltetrazole and co-polymers of N-vinyl 5-phenyltetrazole with styrene, ethylene, propylene, acrylic acid and esters, methacrylic acid and esters and the like.

As high temperature blowing agents for rubber and thermoplastic resins, novel blowing agent compositions of the present invention include N-substituted 5-phenyltetrazole polymers produced by the polymerization reaction of an alkali metal 5-phenyltetrazole with poly(epichlorohydrin) as represented by the following formula:

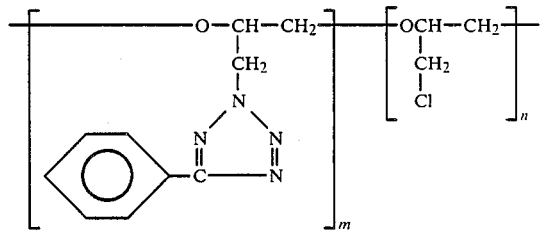

wherein m represents at least 20 percent of the moieties in the copolymer, and n represents the remaining moieties.

N-substituted 5-phenyltetrazole compounds which are preferred as blowing agents in the present invention are isomeric mixtures in which the substituents are attached at the 1- and 2-positions of the tetrazole ring.

The novel blowing agents of the present invention may be produced by any suitable process including the reaction of nitrilium salts with sodium azide as taught by Lee et al (J. Org. Chem. 37, 347–347, 1972), the reaction of epoxides with 2-tri-n-butylstannyl tetrazoles as described by Casey et al (J. Chem. Soc. Chem. Commun. 1982, 714–715) or the reaction of 5-phenyltetrazole with haloalkyl derivatives as illustrated by Henry (J. Am. Chem. Soc. 73, 4470, 1951), Padwa et al (J. Org. Cham. 43, 1664–1671, 1978), or Spear (Aust. J. Chem. 37, 2453, 1984), Preferred production processes are those which produce isomeric mixtures of the N-substituted 5-phenyltetrazoles as exemplified by the reaction of an alkali metal derivative of 5-phenyltetrazole with the selected organic halide. The reaction product of this single stage reaction is an isomeric mixture in which the N-substituent is attached at both the first and second nitrogen atoms in the tetrazole ring. Suitable alkali metal reactants in this process include, for example, sodium 5-phenyltetrazole or potassium 5-phenyltetrazole.

The novel blowing agents of the present invention include compounds such as N-hexyl 5-phenyltetrazole and N-vinylbenzyl 5-phenyltetrazole which are liquids as produced. Liquids are advantageous, for example, in the production of structural foam molding as they can be pumped directly into the foam molding equipment.

The novel blowing agents of the present invention are used in the production of cellular products of thermoplastic or rubber materials which allow processing at elevated temperatures. For example, they may be used with polyolefins such as polypropylene; fluoropolymers; acrylonitrile-butadiene-styrene resins; polystyrene; polyvinyl halides; polyacrylates; polyamides; nylons; polyetherimides; polyimides; polycarbonates; polyphenylene oxides; polyethylene terephthalate; polybutylene terephthalate; polyphenylene sulfides; polysulfones; polysulfonates; polyether ether ketone; liquid crystal polymers such as aromatic polyesters based on p-hydroxybenzoic acid and hydroxynaphthoic acid monomers or terephthalic acid; p,p'-dihydroxybiphenyl and p-hydroxybenzoic acid; rubbers including silicone rubbers, polybutadiene and polyisoprene, and the like, as well as copolymers and graft polymers. The blowing agents of this invention are especially useful, as indicated, with polymers and copolymers that have high processing temperatures such as polycarbonates, polyphenylene oxides, polyetherimides, and polybutylene terephthalate.

The N-substituted 5-phenyltetrazole blowing agents of the present invention may be employed by incorporating a small, but effective, blowing amount of the material into a gas-expandable polymer. The amount of such material will vary, depending on the polymer foam density desired and other processing and temperature factors which are well known. However, typically, the compounds may be employed by incorporating, for example, from about 0.05 to about 15 percent by weight of the compound as a blowing agent; preferably, from about 0.1 to 10 percent, in preparing rigid or structural foam products such as those of polycarbonate resins. The blowing agents may be employed alone or in combination with other blowing agents, stabilizers, antioxidants, fillers, plasticizers, cross-linking agents, dyes, pigments, carbon and other additives employed in polymeric compositions.

The novel blowing agents of the present invention as liquids may, just prior to injection into the mold, be directly incorporated into the molten rubber or thermoplastic material in an injection molding machine. Solid or liquid blowing agents can be incorporated, for example, into a polycarbonate homopolymer in a Banbury mixer, and the mixed mass milled into a large sheet or other form and subsequently processed into pellets. The polycarbonate homopolymer containing the blowing agent may then be placed or extruded into a multicavity mold and preheated to a temperature above the blowing temperature of the blowing agent for a period of time to produce a rigid structural foam polycarbonate product.

To further illustrate the present invention, the following examples are given with no intention of being limited thereby. All parts and percentages are by weight unless otherwise stated.

EXAMPLE 1

Synthesis of N-Hexyl 5-Phenyltetrazole

5-Phenyltetrazole (29.2 g, 0.2 mole) was placed in 300 ml of ethanol and sodium methylate (11 g, 0.2 mole) added. On the addition of bromohexane (33 g, 0.2 mole), the solution cleared immediately. The mixture slowly became cloudy on four hours refluxing. Filtering followed by stripping gave 21.2 g of a yellow liquid.
Elemental Analysis:
Calc. C, 67.80; H, 7.88; N, 24.33.
Found C, 66.80; H, 7.26; N, 23.87.

Confirmed by infra-red and by NMR analyses, the product was found to be a mixture of the 1- and 2-isomers.

EXAMPLE 2

Synthesis of N-Benzyl 5-Phenyltetrazole

Benzyl chloride (0.15 mole; 19.0 g), sodium 5-phenyltetrazole (0.165 mole; 27.4 g) and 2-methoxyethanol (100 ml) were heated at 100° C. for 3.5 hours). The mixture was cooled to precipitate NaCl. Water (250 ml) was added to the filtrate to precipitate a product which was filtered, washed with H$_2$O (50 ml) and dried in-vacuo at 60° C. for four hours. The product weight was 32.8 g. (92.5 percent yield), m.p. 54°-67° C. Reported; 2-benzyl-5-phenyltetrazole, m.p. 65.5°-66° C. 1-benzyl-5-phenyltetrazole, m.p. 92.5°-93° C. Elemental analysis found: C, 71.57; H, 5.30; N, 21.39. Calculation for C$_{14}$H$_{12}$N$_4$: C, 71.17; H, 5.12; N, 23.71. $^{13}$C NMR established a 3/1 isomer ratio for the 2-benzyl/1-benzyl substitution products, respectively. The isomers are represented by the following structures;

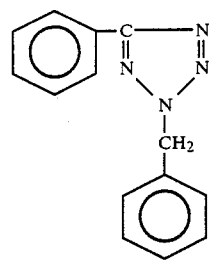

2-Benzyl 5-Phenyltetrazole

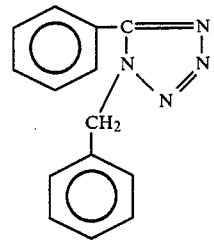

1-Benzyl 5-Phenyltetrazole

EXAMPLE 3

Synthesis of N-Vinylbenzyle 5-Phenyltetrazole

Vinylbenzyl chloride (0.10 mole; 15.3 g, 60 percent meta-/40 percent para; Dow Experimental Monomer XC1915.00 stabilized with 5-butyl catechol (50 ppm) and nitromethane (700–1000 ppm)) was dissolved in 2-methoxyethanol (250 ml). This solution was added to a solution of sodium 5-phenyltetrazole (0.11 mole; 18.5 g) in 2-methoxyethanol and the reactants heated at 100° 'C. / 15 hours. The mixture was quenched with H$_2$O (700 ml), extracted with CH$_2$Cl$_2$ (2×200 ml), the extracts washed with H$_2$O (500 ml) and concentrated to give a viscous liquid (weight 26.0 g; 98.8 percent, yield). Mass spectral assay (electron impact and chemical ionization) showed a molecular weight ion peak at 262 (theor. 262.34). $^{13}$C NMR confirmed the presence of two isomers (3.65/1 ratio) corresponding to 2-vinylbenzyl 5-phenyltetrazole and 1-vinylbenzyl 5-phenyltetrazole. Elemental analysis found: C, 71.06; H, 5.42;

N, 20.51; Cl, 1.43. Calculation for $C_{16}H_{14}N_4$: C, 73.26; H, 5.38; N, 21.38.

EXAMPLE 4

Synthesis of Poly(N-vinylbenzyl 5-phenyltetrazole)

A solution of vinylbenzyl-5-phenyltetrazole monomer (0.057 mole; 14.88 g), toluene (400 ml) and benzoyl peroxide (0.30 g) was heated to reflux at 111° C. for four hours. Additional benzoyl peroxide initiator (0.3 g) was added and heating resumed for an additional four hours. Concentration gave 15.27 g of polymer, m.p. '°-100° C. gas evolution began at 203° C. $^{13}C$ NMR corroborated the structure of poly(vinylbenzyl-5-phenyltetrazole) consisted of two isomers.

EXAMPLE 5

Synthesis of Poly(N-vinylbenzyl 5-phenyltetrazole)

A solution consisting of poly(vinylbenzyl chloride) (60 percent meta-; 40 percent para; 0.10 mole, 15.26 g) and 2-methoxyethanol (280 ml) was added to sodium 5-phenyltetrazole (0.11 mole, 18.5 g) dissolved in 150 ml 2-methoxyethanol and the reactants heated at 90°–110 ° C. for four hours. The product solution was quenched with $H_2O$ ( 500 ml) and the aqueous layer siphc.oned. The polymer was resolubilized in 2-methoxyethanol (485 ml/90C° .), quenched with $H_2O$ (500 ml) and the $H_2O$ layer again siphoned. The polymer was washed with water (500 ml) and vacuum-dried, weight 23.6 g (0.09 mole), corresponding to 90 percent in-hand yield. The polymer gradually melted, over the range, 98°–145° C. gas evolution commenced at 215° C. $^{13}C$ NMR corroborated signals which corresponded to that of the proposed structure, poly(vinylbenzyl 5-phenyltetrazole) consisting of two isomers (3.65/1 ratio) and containing negligible starting material.

Elemental analysis found: C, 71.75; H, 5.75; N, 18.51; Cl, 2.02. Calculation for $(C_{16}H_{14}N_4)_x$: above polymer was compared with poly(vinylbenzyl chloride):

| | Number Average Mol. Wt. | Number Average Mol. Wt. | Z Average | Dispersivity Factor |
|---|---|---|---|---|
| Poly(vinylbenzyl 5-phenyltetrazole) | 14,375 | 26,970 | 47,469 | 1.88 |
| Poly(vinylbenzyl chloride) | 9,661 | 25,280 | 67,724 | 2.62 |

EXAMPLE 6

Synthesis of N-(2,3-Dihydroxypropyl) 5-Phenyltetrazole

A solution of 3-chloro-2-hydroxypropyl methacrylate (0.50 mole; 89.3 g. and 500 ppm 4-methoxyphenol as inhibitor) in 2-methoxyethanol (300 ml) was added to sodium 5-phenyltetrazole (1.0 mole; 168.2 g) dissolved in 2-methoxyethanol (800 ml) and heated at 100° C. for 14.5 hours. The product solution was quenched with $H_2O$ (150 ml), extracted with $CH_2Cl_2$ (3×500 ml), the extracts washed with $H_2O$ (500 ml) and concentrated to a semi-solid, m.p. 25°–115° C, gas evolution, 219° C.

An aliquot of the crude product (99.3 g) was dissolved in toluene (1 liter) and heated at 110° C. for 3 hours in the presence of benzoyl peroxide (4.0 g) as a catalyst. Additional catalyst (0.5 g) was added and heating resumed for 4 hours. The reaction mixture was concentrated to 250 ml and cooled. The product filtered and dried (weight 75.7 g) had a melting point of 88.5°–90° C. when heated gas evolution became pronounced at 205° C. Mass spectral assay established that this product was N-(2,3-dihydroxydroxypropyl (5 -phenyltetrazole), m/e 220.

Structure corroboration was also provided by $^{13}C$ NMR. Based on aliquot correction, the yield of this product was 107.9 g (0.490 mole), 97.9 percent yield.

EXAMPLE 7

Synthesis of Copolymer of Poly(Glycidyl 5-Phenyl-tetrazole and Epichlorohydrin

Polyepichlorohydrin (0.17 mole, 15.74 g, HYDRIN ®, 10X 2 polyether, M.W. 3400, B. F. Goodrich) was dissolved in 2-methoxyethanol (250 ml) and admixed with sodium 5-phenyltetrazole (0.187 mole, 31.45 g) dissolved in 2-methoxyethanol (200 ml). The mixture was heated at 85°–125° C. for 23.25 hours, quenched in $H_2O$ (500 ml) and the aqueous layer siphoned. The residual polymer was re-solubilized with 2-methoxyethanol (90° C./200 ml), quenched with $H_2O$ (500 ml) and the aqueous layer again siphoned. The polymer was dried (50° C./5 mm) to constant weight, weight 30.97 g; m.p. 65 °–70° C., with gas evolution occurring at 128°–130° C., but became more pronounced from 188°–225° C. 13C NMR established that 30 to 40 percent of the halogen in the pendant —$CH_2Cl$ groups was displaced in 5-phenyltetrazole.

EXAMPLES 8-12

The decomposition temperatures of the novel high temperature blowing agents of the present invention and the 5-phenyltetrazole control were determined by differential scanning colorimetry. To determine the gas yields each compound was separately blended with 4–6 grams of dioctylphthalate and placed in a test tube connected to a gas buret. The test tube was heated in a sand bath until decomposition occurred. The gas yields are given in TABLE I below.

TABLE I

| Example No. | High Temperature Blowing Agent | Decomposition Temp. (DSC) (°C.) | Gas Yield (cc/gm) |
|---|---|---|---|
| Control | 5-Phenyltetrazole | 216 | 175 |
| 8 | N—Hexyl 5-phenyltetrazole | 226 | 117 |
| 9 | N—Benzyl 5-phenyltetrazole | 231 | 129 |
| 10 | N—(2,3-Dihydroxypropyl) 5-phenyltetrazole | 237 | 108 |
| 11 | N—Vinylbenzyl 5-phenyl tetrazole | 228 | 82 |
| 12 | Poly(N—vinylbenzyl 5-phenyltetrazole) | 224 | 97 |

EXAMPLES 13-14

N-Hexyl 5 -phenyltetrazole and N-benzyl 5 -phyenyltetrazole, high temperature blowing agents of the present invention and 5 -phenyltetrazole as the control were blended with a polycarbonate resin containing 10 percent glass reinforcement (MERLON ® 8310 Polycarbonate, Mobay Chemical Co.) at the equivalent of 0.2 percent of 5-phenyltetrazole based on gas yield. The blends were dried for six hours at 121° C. and sealed in glass bottles to prevent moisture absorption. The blends were injection molded into structural foam molds to produce molded foam plaques 2.0×8.0×0.375 inches. Each blend generated a good structural foam molded part. The density and Izod impact strength of the foam plaque produced from each blend was measured and the results recorded in TABLE II below.

TABLE II

| Example No. | High Temperature Blowing Agent | Polycarbonate Density (LB/FT³) | Izod Impact Strength* (FT-LB/IN) |
|---|---|---|---|
| 13 | N—Hexyl 5-Phenyltetrazole | 82.60 | 7.36 |
| 14 | N—Benzyl 5-Phenyltetrazole | 82.50 | 6.41 |
| Control | 5-Phenyltetrazole | 81.30 | 5.24 |

*No-notched

EXAMPLES 15–17

N-Substituted 5-phenyltetrazole high temperature blowing agents of the present invention and 5-phenyltetrazole as the control were dry blended with a polycarbonate resin containing 6 percent glass reinforcement (CALIBRE ® 7070 Polycarbonate, Dow Chemical Co.) at the equivalent of 0.2 percent of 5-phenyltetrazole based on gas yield. The blends were structural foam molded in plaques using the process of Examples 13 and 14. The density and Izod impact strength of the foamed plaque from each blend was measured and the results recorded in TABLE III below.

TABLE III

| Example No. | High Temperature Blowing Agent | Polycarbonate Density (LB/FT³) | Izod Impact Strength* (FT-LB/IN) |
|---|---|---|---|
| 15 | N—Vinylbenzyl 5-phenyltetrazole | 73.85 | 7.0 |
| 16 | N—(2,3-Dihydroxypropyl) 5-phenyltetrazole | 75.00 | 6.9 |
| 17 | Poly(N—vinyl benzyl 5-phenyltetrazole) | 73.80 | 6.8 |
| Control | 5-Phenyltetrazole | 68.44 | 4.2 |

*No-notched

The novel blowing agents of Examples 13 through 17 resulted in a foamed product having a significant increase in impact strength over that of the foamed product formed with the control blowing agent.

What is claimed is:

1. In a process for the production of cellular products which comprises incorporating a blowing agent into rubber or a synthetic thermoplastic polymer, the improvement which comprises using as the blowing agent a tetrazole compound represented by the formula:

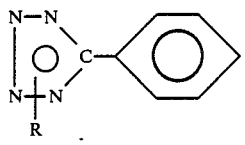

in which R represents an alkyl, cycloalkyl, hydroxyalkyl, polyhydroxyalkyl, aryl, alkylaryl, aralkylene, alkenyl, alkenylaryl or alkenylaralkylene group.

2. The process of claim 1 in which R represents an alkyl group having from 1 to about 10 carbon atoms.

3. The process of claim 1 in which the tetrazole compound is an isomeric mixture in which R is at the 1- and 2-positions of the tetrazole ring.

4. The process of claim 1 in which R represents a cycloalkyl group having from about 3 to about 6 carbon atoms.

5. The process of claim 1 in which R represents a hydroxyalkyl or polyhydroxyalkyl group in which the alkyl moiety contains from 1 to about 6 carbon atoms.

6. The process of claim 1 in which R represents a phenyl or naphthyl group.

7. The process of claim 1 in which R represents an alkylaryl group in which the alkyl moiety contains from 1 to about 6 carbon atoms, and the aryl moiety is phenyl or naphthyl.

8. The process of claim 1 in which R represents an aralkylene group in which the alkylene moiety is selected from the group consisting of methylene, ethylene, and propylene and the aryl moiety is phenyl or naphthyl.

9. The process of claim 1 in which R represents an alkenyl or alkenylaryl group in which the alkenyl moiety contains from 2 to about 6 carbon atoms, and the aryl moiety is phenyl or naphthyl.

10. The process of claim 1 in which R is an alkenylaralkylene group in which the alkenyl moiety contains from 2 to about 6 carbon atoms, the aryl moiety is phenyl or naphthyl, and the alkylene moiety is selected from the group consisting of methylene, ethylene, and propylene.

11. The process of claim 1 in which the cellular products of the synthetic thermoplastic polymers are selected from the group consisting of polyolefins; fluoropolymers; acrylonitrile - butadiene - styrene resins; polystyrene; polyvinyl halides; polyacrylates; polyamides; nylons; polyimides; polyetherimides; polycarbonates; polyphenylene oxides; polyethylene terephthalate; polybutylene terephthalate; polyphenylene sulfides; polysulfones; polyether ether ketone; polysulfonates; liquid crystal polymers; and copolymers thereof.

12. The process of claim 2 in which R represents an alkyl group having from about 4 to about 8 carbon atoms.

13. The process of claim 12 in which the N-alkyl 5-phenyltetrazole compound is an isomeric mixture where R is at the 1- and 2-positions of the tetrazole ring.

14. The process of claim 13 in which R represents a pentyl or hexyl group.

15. The process of claim 8 in which the alkylene moiety is methylene.

16. The process of claim 15 in which the blowing agent is N-benzyl 5-phenyltetrazole.

17. The process of claim 5 in which R represents an isomeric mixture of 1-dihydroxyalkyl 5-phenyltetrazole and 2-dihydroxyalkyl 5-phenyltetrazole.

18. The process of claim 17 in which R represents a 2,3-dihydroxypropyl group.

19. The process of claim 11 in which the cellular products of thermoplastic materials are selected from the group consisting of polycarbonates, polyphenylene oxides, polyetherimides, and polybutylene terephthalate.

20. The process of claim 1 in which the blowing agent is employed in amounts of from about 0.05 to about 15 percent by weight.

* * * * *